United States Patent [19]

Yamaguchi et al.

[11] Patent Number: 5,222,226

[45] Date of Patent: Jun. 22, 1993

[54] SINGLE-CHIP MICROPROCESSOR HAVING VARIABLE MEMORY ADDRESS MAPPING

[75] Inventors: Satoru Yamaguchi, Nagoya; Hitoshi Takahashi, Kasugai, both of Japan

[73] Assignees: Fujitsu Limited; Fujitsu VLSI Limited, Kawasaki, Japan

[21] Appl. No.: 799,720

[22] Filed: Nov. 26, 1991

Related U.S. Application Data

[63] Continuation of Ser. No. 323,758, Mar. 15, 1989, abandoned.

[30] Foreign Application Priority Data

Mar. 18, 1988 [JP] Japan .................. 63-66140

[51] Int. Cl.⁵ .............................. G06F 12/02
[52] U.S. Cl. ..................... 395/425; 364/DIG. 1; 364/245; 364/245.2; 364/246; 364/243; 364/232.8; 364/246.3
[58] Field of Search ........... 395/400, 425, 725, 800, 395/325

[56] References Cited

U.S. PATENT DOCUMENTS

| | | | |
|---|---|---|---|
| 3,742,458 | 6/1973 | Inoue et al. | 364/200 |
| 4,298,934 | 11/1981 | Fischer | 364/200 |
| 4,382,279 | 5/1983 | Ugon | 364/200 |
| 4,393,443 | 7/1983 | Lewis | 364/200 |
| 4,432,067 | 2/1984 | Nielsen | 364/900 |
| 4,485,457 | 11/1984 | Balaska et al. | 364/900 |

OTHER PUBLICATIONS

Aichelmann, Jr. et al., "Hierarchy Memory For Improved Microprocessor Performance", IBM Technical Disclosure Bulletin, vol. 19, No. 8, Jan. 1977, pp. 3071-3073.

Primary Examiner—Kevin A. Kriess
Attorney, Agent, or Firm—Staas & Halsey

[57] ABSTRACT

A microprocessor has a memory part including a memory for storing programs, a central processing unit for carrying out an operation on a data stored in the memory part depending on the programs stored in the memory, a holding part for entering an address region information with a predetermined timing and for holding the address region information, which indicates an allocation of a predetermined address region for the memory, an address generating part for generating an address of a command which is to be executed next, and an access enable part for enabling access to the memory when the address generated by the address generating part is included in the predetermined address region.

13 Claims, 3 Drawing Sheets

FIG. 1 (PRIOR ART)
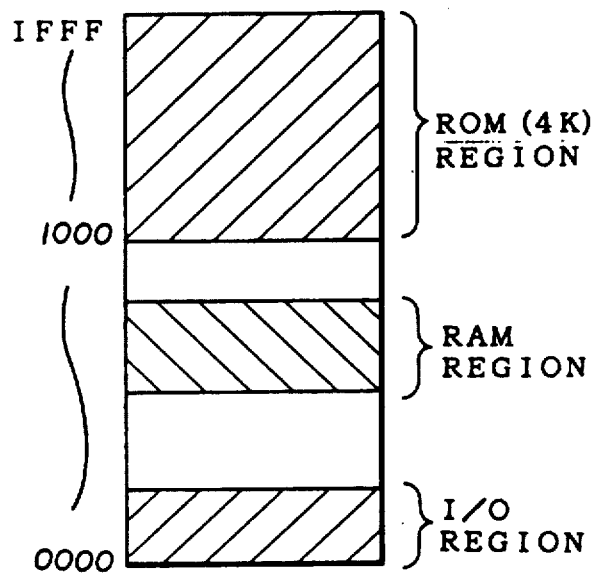
FIG. 2A     FIG. 2B     FIG. 2C
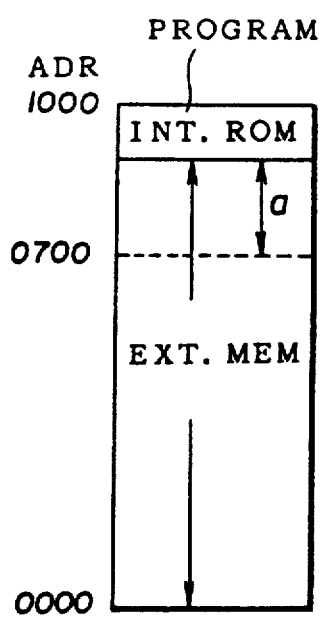
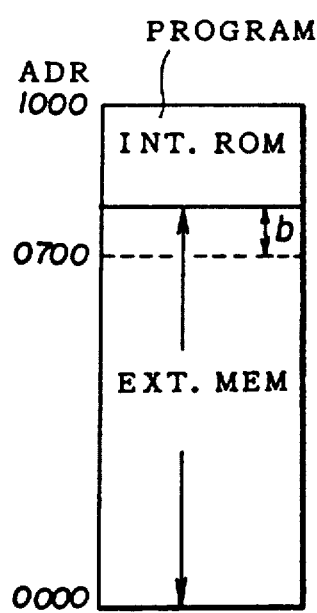
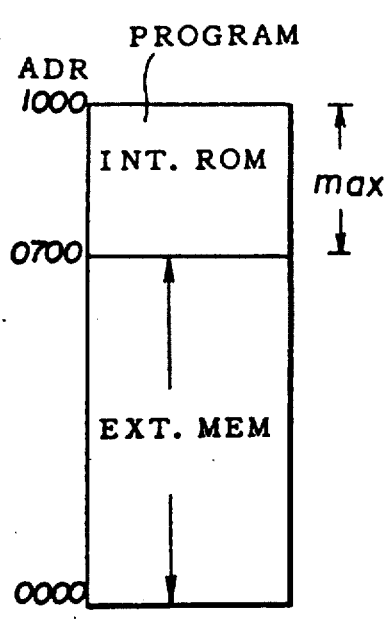
VERSION A        VERSION B        VERSION C

SINGLE-CHIP MICROPROCESSOR HAVING VARIABLE MEMORY ADDRESS MAPPING

This application is a continuation of application No. 07/323,758, filed Mar. 15, 1989, now abandoned.

BACKGROUND OF THE INVENTION

The present invention generally relates to microprocessors, and more particularly to a microprocessor which is developed by use of a piggy chip and an evaluation chip.

Generally, in a large scale integrated circuit having a one-chip structure and especially in a microprocessor, an evaluation chip is used in an initial stage of the development of the microprocessor. The evaluation chip has no mask read only memory (ROM) for storing programs. For this reason, a so-called piggy back type package which may be mounted with an external memory (piggy chip) is used. In this type of a microprocessor, the programs stored in the external memory are executed for the purpose of developing the software and carrying out function tests. When the functions satisfying a desired specification are obtainable, the development process advances to a mask data write process for writing the software into the mask ROM. The designing of the hardware portion excluding the ROM is already completed when carrying out this mask data write process. Thus, the designing of the logic, the circuit and the mask pattern is omitted for this completed hardware portion, and it is possible to produce different kinds of microprocessors having different software functions.

But in such a microprocessor, the addresses allocated for the ROM, a random access memory (RAM) and an input/output interface are fixed. That is, the so-called memory map is fixed. As a result, when mass producing a family of microprocessor chips which only differ in the memory capacities of the respective ROMs, for example, it is necessary to prepare a number of evaluation chips corresponding to a number of ROM versions. Therefore, there is a problem in that the cost of developing such a family of microprocessor chips becomes high.

FIG. 1 shows an example of a memory map of conventional microprocessor when the memory capacity of the ROM is 4 kbytes. In this case, an address region allocated for an external programmable (ROM) and the like at the time of the evaluation corresponds only to a "ROM region" shown in FIG. 1. Address regions respectively allocated for the RAM and the input/output interface are indicated as "RAM region" and I/O region". Accordingly, an evaluation chip for use in evaluating the microprocessor having the ROM with the 4 kbyte memory capacity cannot be used for an accurate evaluation of different versions of the microprocessor having ROMs with 8 kbyte and 16 kbyte memory capacities, for example, even though the hardwares of these different versions of the microprocessor excluding the ROMs are the same.

A description will now be given of the problems which are introduced when different versions of the microprocessor chip are evaluated by use of the same evaluation chip. FIGS. 2A, 2B and 2C respectively show memory maps of versions A, B and C of the microprocessor chip. As may be seen from FIGS. 2A, 2B and 2C, the ROM of the version A microprocessor chip has the smallest memory capacity, the ROM of the version B microprocessor chip has the intermediate memory capacity and the ROM of the version C microprocessor chip has the largest memory capacity. In this case, the memory map of the evaluation chip is set as shown in FIG. 3 and the addresses allocated for the ROM is matched to that of the version C microprocessor having the ROM with the largest memory capacity.

The evaluation of the version C microprocessor chip can be carried out satisfactorily by use of the evaluation chip having the memory map shown in FIG. 3 because a ROM enable signal is generated only in the memory region allocated for the ROM of the version C microprocessor chip. However, when evaluating the version A (or B) microprocessor chip by use of the same evaluation chip, a ROM enable signal is also generated in a memory region a (or b) which actually is not allocated for the ROM of the version A (or B) microprocessor chip. As a result, an accurate evaluation of the version A (or B) microprocessor chip cannot be made by use of the evaluation chip which has the memory map shown in FIG. 3.

SUMMARY OF THE INVENTION

Accordingly, it is a general object of the present invention to provide a novel and useful microprocessor in which the problems described above are eliminated.

Another and more specific object of the present invention is to provide a microprocessor which enables the use of a common evaluation chip for the evaluation of different versions of the microprocessor having ROMs with different memory capacities.

Still another object of the present invention is to provide a microprocessor comprising a memory part including a memory for storing programs, a central processing unit for carrying out an operation on a data stored in the memory part depending on the programs stored in the memory of the memory part, holding means for entering an address region information with a predetermined timing and for holding the address region information, where the address region information indicates an allocation of a predetermined address region for the memory, address generating means for generating an address of a command which is to be executed next, and access enable means for enabling access to the memory when the address generated by the address generating means is included in the predetermined address region. According to the microprocessor of the present invention, it is possible to make a programmable memory mapping by merely changing the address region information. Hence, even when there are different versions of the microprocessor respectively having a ROM with different memory capacities, for example, it is possible to use a single evaluation chip to evaluate these different versions of the microprocessor by appropriately changing a portion of the address region information. Therefore, it is possible to considerably reduce the cost of developing the microprocessor.

Other objects and further features of the present invention will be apparent from the following detailed description when read in conjunction with the accompanying drawings.

BRIEF DESCRIPTION OF THE DRAWINGS

FIG. 1 generally shows an example of a memory map of a conventional microprocessor;

FIGS. 2A through 2C respectively show memory maps of different versions of the microprocessor;

DETAILED DESCRIPTION

Figure 3:
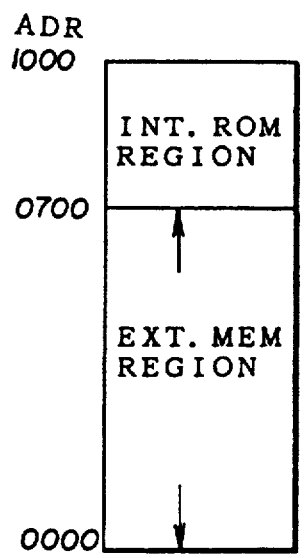
FIG. 3 shows a memory map of a conventional evaluation chip for use in evaluating the different versions of the microprocessor.
Figure 4:
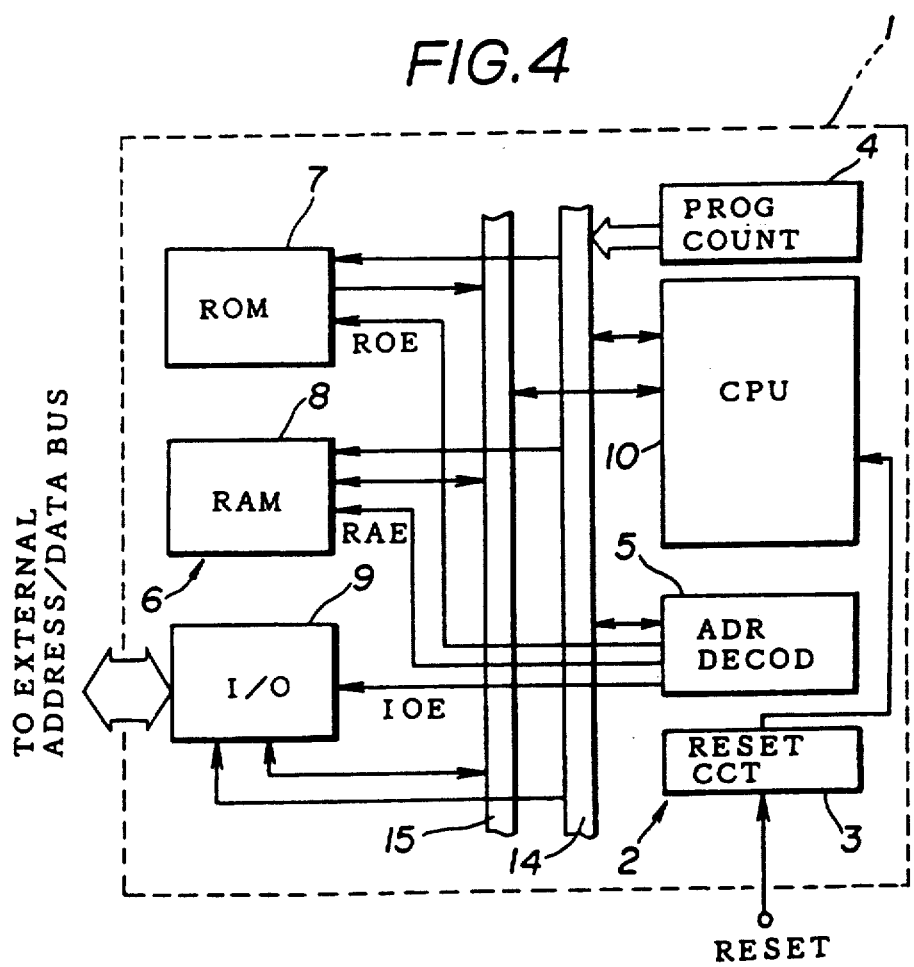
FIG. 4 is a system block diagram showing an embodiment of a microprocessor according to the present invention.
Figure 5:
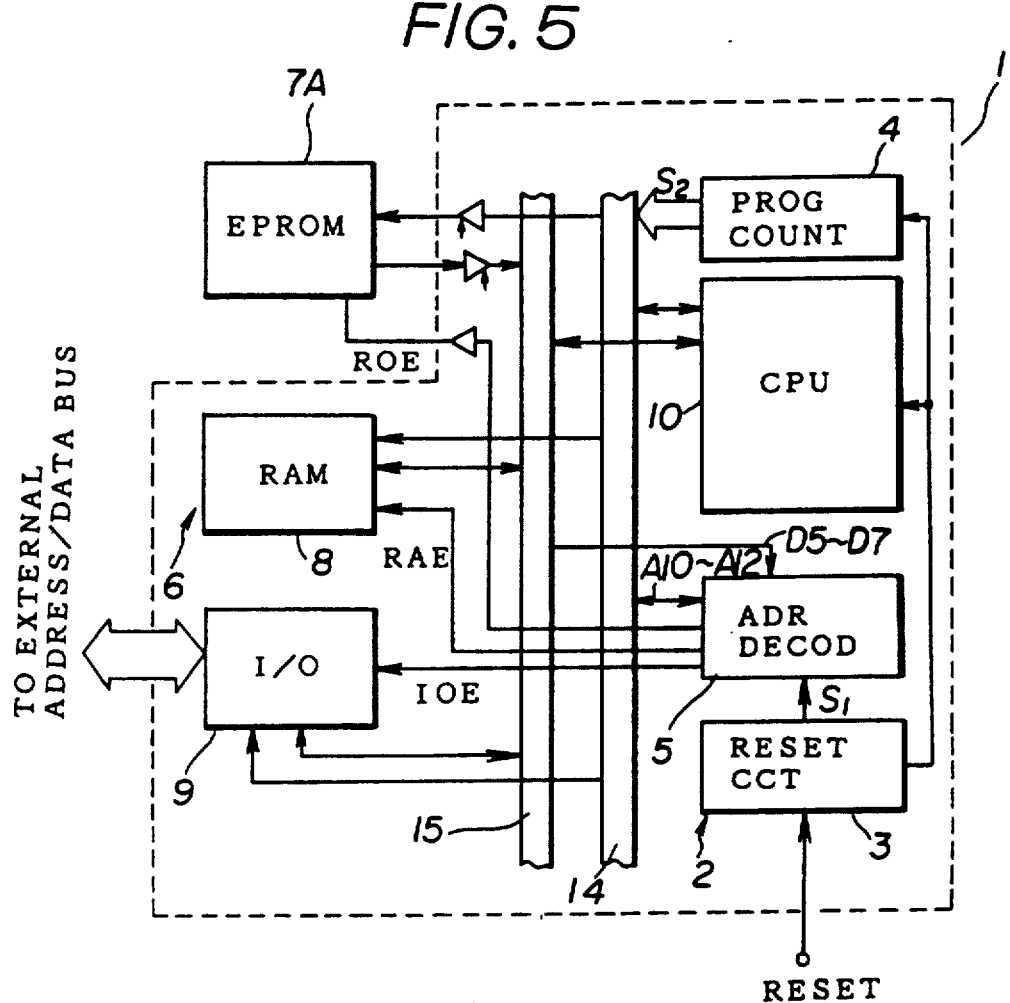
FIG. 5 is a system block diagram showing the microprocessor shown in FIG. 4 in an initial stage of development.

FIG. 4 shows an embodiment of a microprocessor according to the present invention and FIG. 5 generally shows an evaluation chip in an initial stage of development of the microprocessor shown in FIG. 4 which is mass produced. In FIGS. 4 and 5, a microprocessor 1 has an address control part 2, a memory part 6, an input/output port 9 and a central processing unit (CPU) 10 which are coupled to each other through an address bus 14 and a data bus 15.

The address control part 2 is made up of a reset circuit 3, a program counter 4 and an internal address decoder 5. The reset circuit 3 outputs a control signal S1 for carrying out an initial setting of the inside of the microprocessor 1 responsive to an external reset signal RESET. The program counter 4 is essentially an address generating means for incrementing a count every time a command is executed so as to output an address signal $S_2$ which indicates an address of a command which is to be executed next. When the reset circuit 3 outputs the control signal $S_1$, the program counter 4 sets the address signal $S_2$ to a predetermined value (for example, FFFD) and outputs the address signal $S_2$. The internal address decoder 5 outputs one of a ROM enable signal ROE, a RAM enable signal RAE and an input/output port enable signal IOE responsive to the address signal $S_2$ received from the program counter 4. The internal address decoder 5 outputs the ROM enable signal ROE at least when the address signal $S_2$ from the program counter 4 is set to the predetermined value (for example, FFFD). The enable signals ROE, RAE and IOE are designators for designating an object medium for every divided memory region which is obtained by dividing a memory space having a predetermined size into predetermined regions. For example, the ROM enable signal ROE designates a mask ROM 7 as the object medium and enables only an access to the ROM 7 while the ROM enable signal ROE is outputted.

The memory part 6 is made up of the ROM 7 and a RAM 8. The ROM 7 stores programs including commands and various kinds of information. In the initial stage of development of the microprocessor 1, an external electrically programmable ROM (EPROM) 7A is used as a piggy memory chip in place of the ROM 7 as shown in FIG. 5, and this EPROM 7A is detachably mounted on the package of the microprocessor 1. An access to the RAM 8 is enabled while the RAM enable signal RAE is outputted.

The input/output port 9 includes input buffers and output buffers, and is coupled to various input/output interfaces provided externally to the microprocessor 1 via several ports. For example, the input or output circuit 9 is designated while the I/0 enable signal IOE is outputted, and the transmission and reception of information between the input/output circuit 9 and the CPU 10.

The CPU 10 carries out various processes such as carrying out an operation on the data stored in the RAM 8 responsive to a command entered from the EPROM 7A and outputting a result of the operation through the input/output port 9.

In addition to the above described functions, the microprocessor 1 of this embodiment has the following additional functions. In other words, the internal address decoder 5 also functions as a holding means for storing an address region information AD which is obtained from within a predetermined address (for example, FFFD) of the EPROM 7A responsive to the predetermined value of the address signal $S_2$ when the reset circuit 3 outputs the control signal $S_1$. In addition, the internal address decoder 5 also functions as an access enable means for enabling an access to the EPROM 7A which is allocated to the predetermined address region by outputting the ROM enable signal ROE while certain upper bits of the address region information AD coincide with certain upper bits of the address signal $S_2$ received from the program counter 4. The address region information AD designates a specific accessible range of a memory space which is formed by the EPROM 7A, the RAM 6 and the input/output port 9 and designates the medium within this range. For example, a ROM region such as that show in FIG. 1 is designated when the upper two bits of the address region information AD are "10". In addition, the ROMs having different memory capacities may be designated by appropriately changing the value of the address region information AD.

Figure 6:
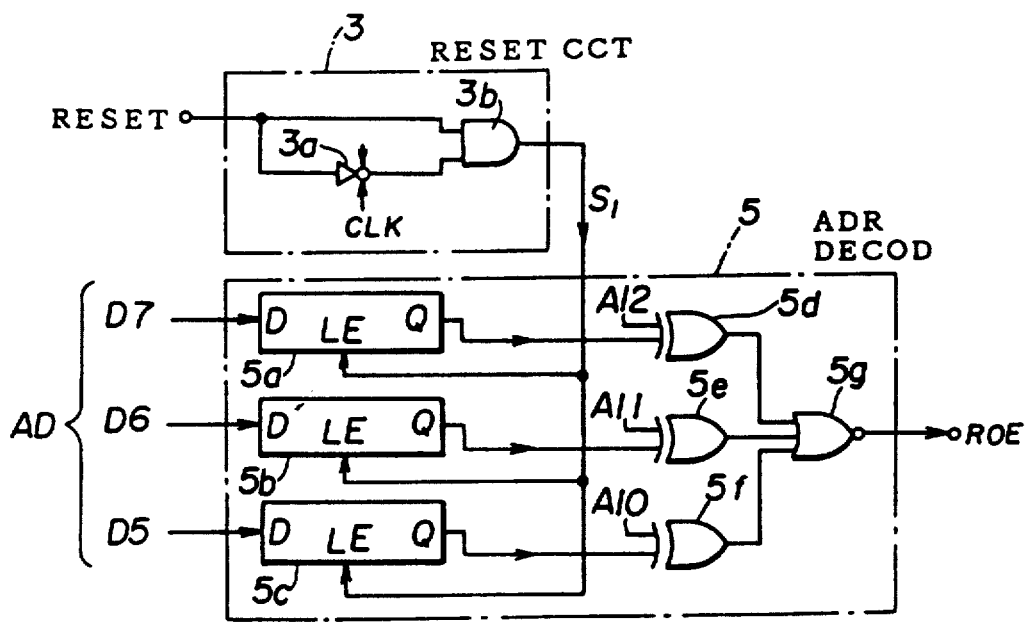
FIG. 6 is a system circuit diagram showing an essential part of the microprocessor shown in FIG. 4.

FIG. 6 shows an essential part of the microprocessor 1 for realizing the additional functions described above. In FIG. 6, the reset circuit 3 has a gate 3a and an AND gate 3b. On the other hand, the internal address decoder 5 has D flip-flops 5a through 5c, exclusive-OR gates 5d through 5f and a NAND gate 5g.

The external reset signal RESET which passes through the gate 3a which operates responsive to a clock signal CLK and the AND gate 3b which constitutes a wave shaping circuit is supplied to the internal address decoder 5 as the control signal $S_1$. The control signal $S_1$ is supplied to latch enable terminals LE of the flip-flops 5a through 5c. The flip-flops 5a, 5b and 5c respectively enter bits D7, D6 and D5 of the address region information AD with a timing determined by the control signal $S_1$, and outputs these bits D7, D6 and D5 of the address region information AD from Q-output terminals thereof. In addition, the flip-flops 5a through 5c respectively hold these bits D7, D6 and D5 of the address region information AD until the next control signal $S_1$ is received. The bits D7, D6 and D5 outputted from the Q-output terminals of the flip-flops 5a, 5b and 5c are supplied to the respectively exclusive-OR gates 5d, 5e and 5f and compared with corresponding three bits A12, A11 and A10 of the address signal $S_2$ which are received from the program counter 4. The ROM enable signal ROE is outputted from the NAND gate 5g and is supplied to the EPROM 7A only when the two input bits coincide in all of the exclusive-OR gates 5d through 5f.

According to this arrangement, the region of the EPROM 7A on the memory map, for example, is determined by the address region information AD written at the predetermined address (for example, FFFD) of the EPROM 7A. In other words, when the external reset signal RESET is received, the address signal $S_2$ from the program counter 4 indicates the predetermined address (for example, FFFD). The access to the EPROM 7A is made depending on this address signal $S_2$, and the address region information AD which is written in advance is read out from the EPROM 7A. The read out address region information AD is stored in the flip-flops 5a through 5c of the internal address decoder 5 and is compared with the address signal $S_2$ which is thereafter received from the program counter 4. When making the comparison, the certain upper bits of the address region information AD and the address signal $S_2$ are compared. Hence, when the the compared bits of the address region information AD and the address signal $S_2$ coincide, a predetermined region of the memory space determined by the address region information AD is indicated by the result of the comparison. Accordingly, when the ROM enable signal ROE is outputted when the compared bits coincide, for example, the object medium of the predetermined region is the EPROM 7A. Furthermore, the position of the object medium on the memory map may be changed by appropriately changing the value of the address region information AD, so that it is possible to freely cope with the case where the memory capacity of the EPROM 7A is large, for example.

According to this embodiment, the address region information AD indicating the region on the memory map is written at the predetermined address of the EPROM 7A, and the address region information AD is stored within the address decoder 5 when the external reset signal RESET is received. Thereafter, the address signal $S_2$ received from the program counter 4 and the address region information AD are compared, and the location of the EPROM 7A on the memory map, for example, is determined depending on the result of the comparison. Hence, it is possible to make a programmable memory mapping by appropriately changing only the address region information of the EPROM 7A. For example, it is unnecessary to prepare an evaluation chip (which is used as the EPROM 7A) exclusively for the different versions of microprocessor even when these versions have ROMs with different memory capacities. Therefore, it is possible to considerably reduce the production cost of microprocessors compared to the conventional microprocessors.

In the described embodiment, the address region information AD is stored in the EPROM 7A. However, the storage location of the address region information AD is not limited to the EPROM 7A, and for example, it is possible to store the address region information AD in an extended memory provided externally to the microprocessor 1.

Further, the present invention is not limited to these embodiments, but various variations and modifications may be made without departing from the scope of the present invention.

What is claimed is:

1. A microprocessor provided on a single chip electrically connectable to another memory and external terminals, comprising:
    a first internal memory;
    a central processing unit, operatively coupled to said first internal memory, executing instruction;
    address generating means for generating an address for accessing said first internal memory;
    reset means for resetting the central processing unit in response to receiving a reset signal;
    holding means for holding memory address mapping information and for receiving from the external terminals the memory address mapping information in response to receipt of the reset signal; and
    access control means, operatively coupled to said first internal memory, to said holding means and to said address generating means, for enabling an access to the another memory by assigning an address region to the another memory when disabling an access to said first internal memory based on the memory address mapping information and the address.

2. The microprocessor as claimed in claim 1, wherein said another memory comprises a memory external to the microprocessor.

3. The microprocessor as claimed in claim 1, which further comprises a second internal memory corresponding to the another memory.

4. The microprocessor as claimed in claim 1, wherein said first internal memory includes means for storing the memory address mapping information.

5. The microprocessor as claimed in claim 1, wherein said first internal memory comprises a read only memory connected to store instructions.

6. The microprocessor as claimed in claim 1, which further comprises:
    reset means for initially setting the microprocessor by outputting a control signal in response to receiving the reset signal.

7. The microprocessor as claimed in claim 6, wherein said first internal memory includes means for storing the memory address mapping information, and said holding means comprises an internal address decoder for holding the memory address mapping information which is read out of said first internal memory when said reset means outputs the control signal.

8. The microprocessor as claimed in claim 6, wherein said first internal memory includes means for storing the memory address mapping information, and said access control means comprises an internal address decoder for enabling an access to said first internal memory by outputting an enable signal during a time in which a value of at least a portion of the memory address mapping information matches a value of a portion of the address generated by said address generating means.

9. The microprocessor as claimed in claim 8, wherein said holding means includes means for holding a variable value of the memory address mapping information that depends on a location of the address region which is allocated for said first internal memory.

10. The microprocessor as claimed in claim 1, wherein said address generating means comprises a program counter for incrementing a count every time in instruction is executed by said central processing unit and for generating the address of an instruction which is to be executed next.

11. The microprocessor as claimed in claim 1, wherein said first internal memory comprises a read only memory which stores instructions, and said another memory comprises a random access memory.

12. The microprocessor as claimed in claim 1, wherein said first internal memory includes means for storing the memory address mapping information, and said holding means includes means for holding a variable value of the memory address mapping information that depends on a location of the address region which is allocated for said first internal memory.

13. A microprocessor provided on a single chip electrically connectable to another memory and external terminals, comprising:
    a first internal memory;

a central processing unit, operatively coupled to said first internal memory, executing instruction;

address generating means for generating an address for accessing said first internal memory;

holding means for holding memory address mapping information;

access control means, operatively coupled to said first internal memory, to said holding means and to said address generating means, for enabling an access to the another memory by assigning an address region to the another memory when disabling an access to said first internal memory based on the memory address mapping information and the address;

a data bus coupled to said central processing unit, to said first internal memory, to the external terminals and to said holding means; and an address bus coupled to said central processing unit, to said address generating means, to said first internal memory and to said access control means, said holding means including a flip-flop connected to hold the memory address mapping information which is received via said data bus from the external terminals in response to a reset signal, said access control means including a detection circuit for detecting whether or not the address received via said address bus matches the memory address mapping information held in said flip-flop.

* * * * *

UNITED STATES PATENT AND TRADEMARK OFFICE
CERTIFICATE OF CORRECTION

PATENT NO. : 5,222,226
DATED : June 22, 1993
INVENTOR(S) : YAMAGUCHI et al.

It is certified that error appears in the above-indentified patent and that said Letters Patent is hereby corrected as shown below:

Col. 6, line 50, change "in" to --an--.

Signed and Sealed this

Ninth Day of August, 1994

Attest:

BRUCE LEHMAN

*Attesting Officer*     *Commissioner of Patents and Trademarks*